United States Patent
Black et al.

(10) Patent No.: US 8,923,167 B2
(45) Date of Patent: Dec. 30, 2014

(54) COMMUNICATION DEVICE FOR SIMULTANEOUS TRANSMISSION BY MULTIPLE TRANSCEIVERS

(75) Inventors: Gregory R. Black, Vernon Hills, IL (US); Ryan J. Goedken, Lake Zurich, IL (US); Thomas D. Nagode, Vernon Hills, IL (US); Ernie Schirmann, Lake Zurich, IL (US); Lawrence R. Schumacher, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 593 days.

(21) Appl. No.: 13/246,280

(22) Filed: Sep. 27, 2011

(65) Prior Publication Data

US 2013/0077540 A1    Mar. 28, 2013

(51) Int. Cl.
*H04B 1/10*    (2006.01)

(52) U.S. Cl.
CPC ............................... *H04B 1/109* (2013.01)
USPC ........................................................ 370/277

(58) Field of Classification Search
CPC .............. H04B 1/50; H04B 1/56; H04B 1/40; H04B 1/109
USPC .......... 370/276, 277, 278, 281, 282, 286, 287, 370/295; 455/73, 88, 550.1
See application file for complete search history.

(56) References Cited

U.S. PATENT DOCUMENTS

| | | | | |
|---|---|---|---|---|
| 6,658,263 | B1 * | 12/2003 | Ke et al. | 455/524 |
| 6,774,857 | B2 * | 8/2004 | Frank | 343/702 |
| 7,777,597 | B2 | 8/2010 | Beaudin et al. | |
| 7,894,779 | B2 | 2/2011 | Meiyappan et al. | |
| 8,005,448 | B1 | 8/2011 | Yan et al. | |
| 2003/0068998 | A1 * | 4/2003 | Yamakawa et al. | 455/339 |

FOREIGN PATENT DOCUMENTS

| | | |
|---|---|---|
| EP | 2256943 A2 | 12/2010 |
| JP | 2002101005 A | 4/2002 |
| WO | 2011119460 A1 | 9/2011 |

* cited by examiner

*Primary Examiner* — Obaidul Huq
(74) *Attorney, Agent, or Firm* — Leydig, Voit and Mayer, Ltd.

(57) ABSTRACT

A communication device reduces intermodulation interference in a simultaneous transmitter using a notch diplexing arrangement. The communication device has a radio front-end module with more than one transceiver for simultaneous transmission with opposing transmit (Tx) band notch filters in series with each duplexer output, and phase rotations into and out of the notch filters suitable for diplexing at the notch filter outputs.

14 Claims, 7 Drawing Sheets

COMMUNICATION DEVICE FOR SIMULTANEOUS TRANSMISSION BY MULTIPLE TRANSCEIVERS

BACKGROUND

1. Technical Field

The present disclosure relates to communication devices, and more particularly to communication devices that simultaneously transmit from multiple transceivers.

2. Description of the Related Art

Cellular communication networks have been implemented using differing technologies in certain geographical areas. Within the same area, new services have been added using different radio access technologies with legacy services maintained for backward compatibility. In addition, certain providers introduce alternative radio access technologies. Increasingly, users of communication devices desire to be able to receive service in any geographic area. Dual-mode communication devices have been offered in order to communicate with different types of radio access technologies.

In addition, even if communicating in the same radio access technology, increasingly communication devices are being offered that incorporate two transceivers so that the communication device can simultaneous transmit and receive with multiple base nodes or base stations. Thereby, the communication device is better able to maintain session continuity during a handoff between cells or to provide more services to the user.

BRIEF DESCRIPTION OF THE DRAWINGS

The description of the illustrative embodiments is to be read in conjunction with the accompanying drawings, wherein.

DETAILED DESCRIPTION

Figure 1:
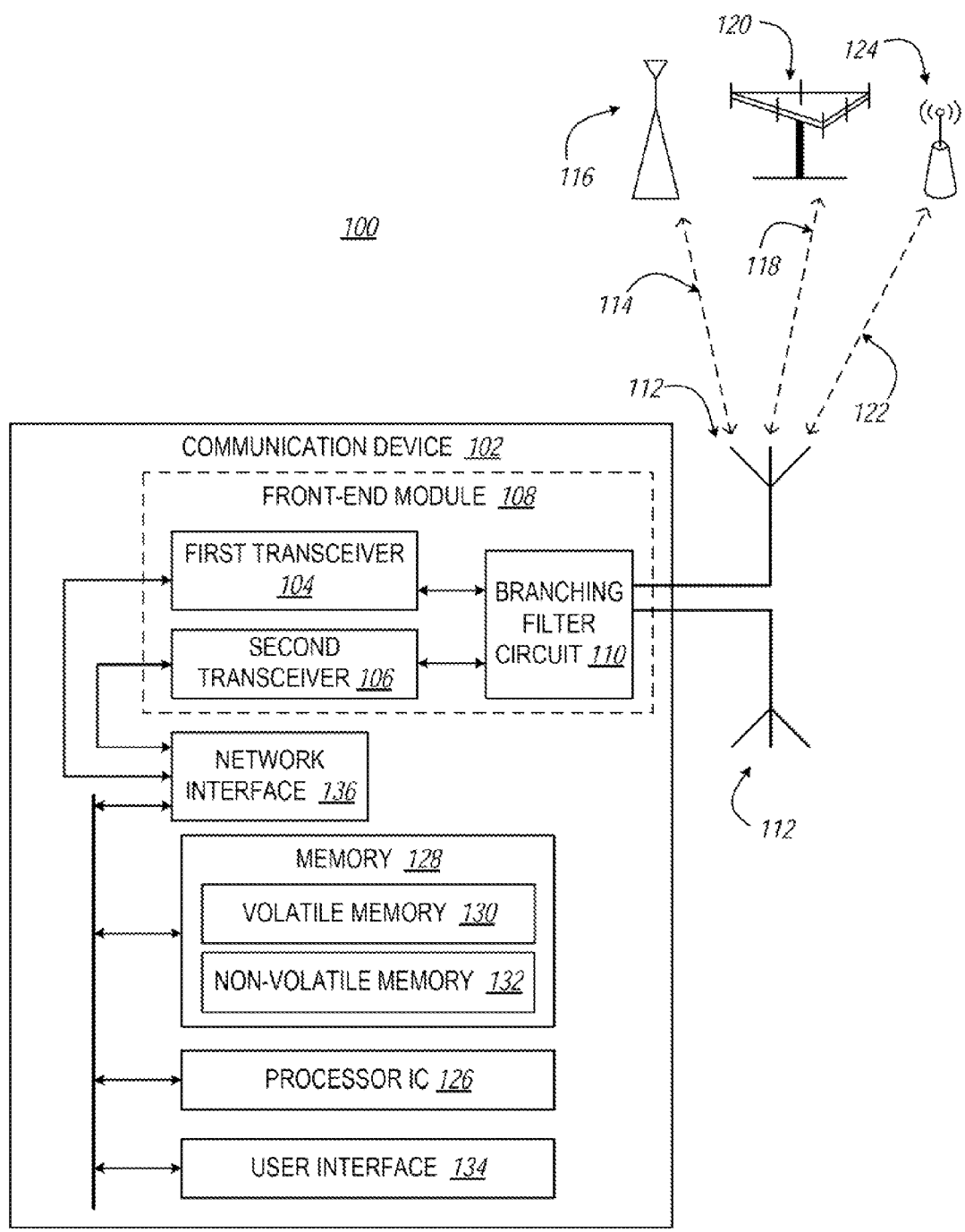
FIG. 1 provides a schematic block diagram of a communication device that simultaneously transmits from at least two transceivers to a communication network according to one embodiment.

The present disclosure provides a radio front-end module with at least two transceivers for simultaneous transmission with reduced intermodulation interference by using opposing transmit (Tx) band notch filters in series with each duplexer output, and phase rotations into and out of the notch filters suitable for low loss combining, or diplexing, at the notch filter outputs. This circuit arrangement has size and cost advantages versus conventional diplexers. The notch filter employs a minimum number of resonators to reject only the transmit band frequencies necessary to eliminate intermodulation distortion, thereby reducing size and cost of the notch filter. Duplexers in series with notch filters band-reject the opposite band transmit frequencies, and impedance mismatch provides the necessary isolation in the opposite receive band frequencies. A communication device utilizing the radio front end module can satisfy requirements of multiple-carrier communication protocols.

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components, or devices or parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within example data processing.

In FIG. 1, a wireless communication network 100 provides multiple communication protocols or multiple radio access opportunities that present an opportunity for simultaneous transmission and simultaneous reception. A communication device 102 can be configured to take advantage of simultaneous transmission with two transceivers 104, 106. In particular, a front-end module 108 that includes the two transceivers 104, 106 converts baseband signals into radio frequencies for transmission and converts received radio frequencies into baseband signals for further processing. A branching filter circuit 110 of the front-end module 108 performs the necessary (a) duplexing for circulating, or distributing, the transmission and received signals between at least one antenna 112 and the two transceivers 104, 106 and (b) diplexing for combining different frequencies as required for these signal distributions.

As utilized herein, diplexing refers to combining two signals having different carrier frequencies in order to couple a single antenna to two or more transmitters, receivers or transceivers. In the present context, diplexing of received signals separates two frequencies as if two filters in parallel were employed, for example a high-pass filter and a low-pass filter. A diplexer is a device that performs diplexing by combining two frequencies.

As utilized herein, duplexing is also performed so that transmission of a transmit signal to the one or more antennas does not transmit to a receiving path. A duplexer is a device that performs duplexing, for example by acting as a circulator. In transmission, the duplexer directs the signal received from a transmitting chain of the transceiver to the antenna. In receiving, the duplexer directs the received signal received from the antenna to a receiving chain of the transceiver. In some embodiments, the transmitted signal and the received signal can be in the same frequency. Alternatively, the transmitted signal and the received signal can be at different frequencies. In the case of the transmitted signal and the received signal being at different frequencies, a duplex filter can be used. A duplex filter is a duplexer comprising two band-pass filters in parallel, with the first band-pass filter passing the transmitted signal frequencies and rejecting the received signal (and other) frequencies, and the second band-pass filter passing the received signal frequencies and rejecting the transmitted signal (and other) frequencies. In this way, the duplex filter provides isolation of the transmitted signal to the receiver and also provides additional functions of attenuating transmitted signals outside of the transmitted band, and attenuating received signals outside of the received signal band.

FIG. 1 depicts the wireless communication network 100 being accessed by the communication device 102 that is designed with the functional components (hardware and software or firmware) required to enable the communication device 102 to simultaneously transmit from the two transceivers 104, 106. The simultaneous transmission is supported with opposing transmit band notch filters in series with each duplexor output that are utilized for band-rejecting the opposite band transmit frequencies, in order to reduce the generation of intermodulation distortion. Diplexing components enable phase rotations into and out of the notch filters suitable for diplexing at the notch filter outputs. The notch filters need not reject the opposing receive band. Instead, duplexor impedance mismatch provides the necessary isolation in the opposing receive bands. Thereby, the notch filter size and cost can be reduced by employing a minimum number of resonators to reject only the transmit band needed to reduce the generation of intermodulation distortion.

Various aspects are described herein in connection with a communication device 102, which can also be called a system, device, subscriber unit, subscriber station, mobile station (MS), mobile, mobile device, remote station, remote terminal, access terminal, user terminal, terminal, communication device, user agent, user device, user equipment (UE), cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

The communication device 102 comprises processor integrated circuit (IC) 126 that is connected to computer-readable storage media, represented generally by memory 128. The memory 128 can include volatile memory 130 and/or non-volatile memory 132. Processor IC 126 may include one or more programmable microprocessors, such as a data processor and a digital signal processor (DSP). The processor IC 126 controls the communication and other functions and/or operations of the communication device 102. These functions and/or operations include, but are not limited to, data processing and signal processing. Communication device 102 also comprises a user interface 134 with one or more input devices, such as a keypad, touch screen, touch pad, microphone, etc. The user interface 134 also comprises output devices, such as a speaker, a haptic interface, display, etc.

The processor IC 126 can utilize a network interface 136 to encode baseband signals for transmitting by the front-end module 108 and to decode received baseband signals received by the front-end module 108 according to appropriate communication protocols. In one embodiment, the communication device 102 can thus be a dual mode (or multimode) communication device that is compatible with more than one form of data transmission or network, as contrasted with single-mode mobiles. For instance, a dual-mode phone can be a telephone which uses more than one technique for sending and receiving voice and data, which could be for wireless mobile phones or for wired phones.

The communication component or front-end module 108, which includes the transceivers 104, 106, performs Radio Frequency (RF) modulation for high speed data transmission, converting between digital baseband signals and analog RF. The branching filter circuit 110 of the front-end module 108 connects each of a first and second transceiver 104, 106 to at least one antenna 112 for transmitting and receiving. In particular, the branching filter circuit 110 performs a duplexing function wherein transmit signals are circulated to the at least one antenna 112 and received signals are circulated to the appropriate transceiver 104, 106. The branching filter circuit 110 performs diplexing (combining) of the transmit signals from the transceivers 104, 106.

In the exemplary embodiment, the branching filter circuit 110 performs duplexing of two transmitted signals and two received signals. In particular, the branching filter circuit 110 transmits a first transmit signal in a first transmit frequency band from the first transceiver 104 to the at least one antenna 112 and transmits a selected one of a first receive signal in the first receive frequency band and a second receive signal in a second receive frequency band. The branching filter circuit 110 transmits a second transmit signal in a second transmit frequency band from the second transceiver 106 to the at least one antenna 112 and transmits another one of the first receive signal in the first receive frequency band and the second receive signal in the second receive frequency band. The branching filter circuit 110 diplexes by using notch filtering to transmit signals in the selected one of a first receive frequency band and a second receive frequency band, to transmit the first transmit signal in the first transmit band, and to attenuate the second transmit signal in the second transmit frequency band. The branching filter circuit 110 also diplexes by using notch filtering to transmit signals in the other one of the first receive frequency band and the second receive frequency band, to transmit the second transmit signal in the second transmit band, and to attenuate the first transmit signal in the first transmit frequency band. By employing notch filters in branching filter circuit 110 the first transmit signal is attenuated into the second transceiver 106 and the second transmit signal is attenuated into the first transceiver 104, thereby reducing intermodulation distortion. Since the notch filters use the minimum number of resonators to reject only the transmit band needed to reduce the generation of intermodulation distortion, the size and cost are reduced.

The simultaneous transmission in different frequency bands enables communication with more than one network node, more than one Radio Access Network (RAN), and/or more than one Radio Access Technology (RAT). For example, a first air interface 114 between communication device 102 and first node or base station 116 can be used to communicate with a first cellular technology, depicted as the first node or base station 116. A second air interface 118 between communication device 102 and second node or base station 120 can be used to communicate with a second cellular technology, depicted as the second node or base station 120. A third air interface 122 between communication device 102 and third node or base station 124 can be used to communicate with a wireless access technology, depicted as the personal access network or an access point 124. Each BS 116, 120 provides wireless service to the UEs or mobile stations (MSs), such as communication device 102, residing in a corresponding coverage area.

The air interfaces 114, 118, 122 can operate in accordance with the particular access technology supported by the corresponding base station (BS) or base node. For example, the air interfaces may all utilize a same technology or they may utilize different access technologies. Moreover, each communication device 102 includes the capability to communicate via voice or data communication services with a BS 116, 120 through one or more wireless communication protocols such as Advanced Mobile Phone System (AMPS), CDMA, Time division multiple access (TDMA), Global System for Mobile communications (GSM), Integrated Digital Enhanced Network (IDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 6000 (CDMA6000), OMA (Open Mobile Alliance), 3GPP (3rd Generation Partnership Project), 3GPP2 (3rd Generation Partnership Project 2), IEEE (Institute of Electrical and Electronics Engineers) 802.xx, European Telecommunications Standards Institute (ETSI), and WiMAX Forum standards and their variants.

In one aspect, the dual communication mode can refer to network compatibility, such as mobile phones containing two types of cellular radios for voice and data. These phones can include combinations of GSM and CDMA technology. The phones can be used as a GSM or CDMA phone according to user preference or available access. These handsets are also called global phones and are essentially two phones in one device. As used herein, a "cellular network" is a system that includes one or more network-based communication devices that communicate with wireless user communication devices in the system and that manage communication between the communication devices. For example, the nodes or base stations (BSs) 116, 120 that present a radio access portion of a cellular network, can be, but not limited to, a Base Node (Node B), evolved Base Node (eNB), an Access Point, or a Base Transceiver Station (BTS).

In another aspect, a dual mode communication device can use both cellular and non-cellular radios for voice and data communication. For example, certain dual mode phones comprise a cellular radio that supports GSM, CDMA, or W-CDMA as well as another technology, such as IEEE 802.11, commonly referred to as Wireless Fidelity or "Wi-Fi") radio, WiMAX (Worldwide Interoperability for Microwave Access), or DECT (Digital Enhanced Cordless Telecommunications) radio.

Figure 2:
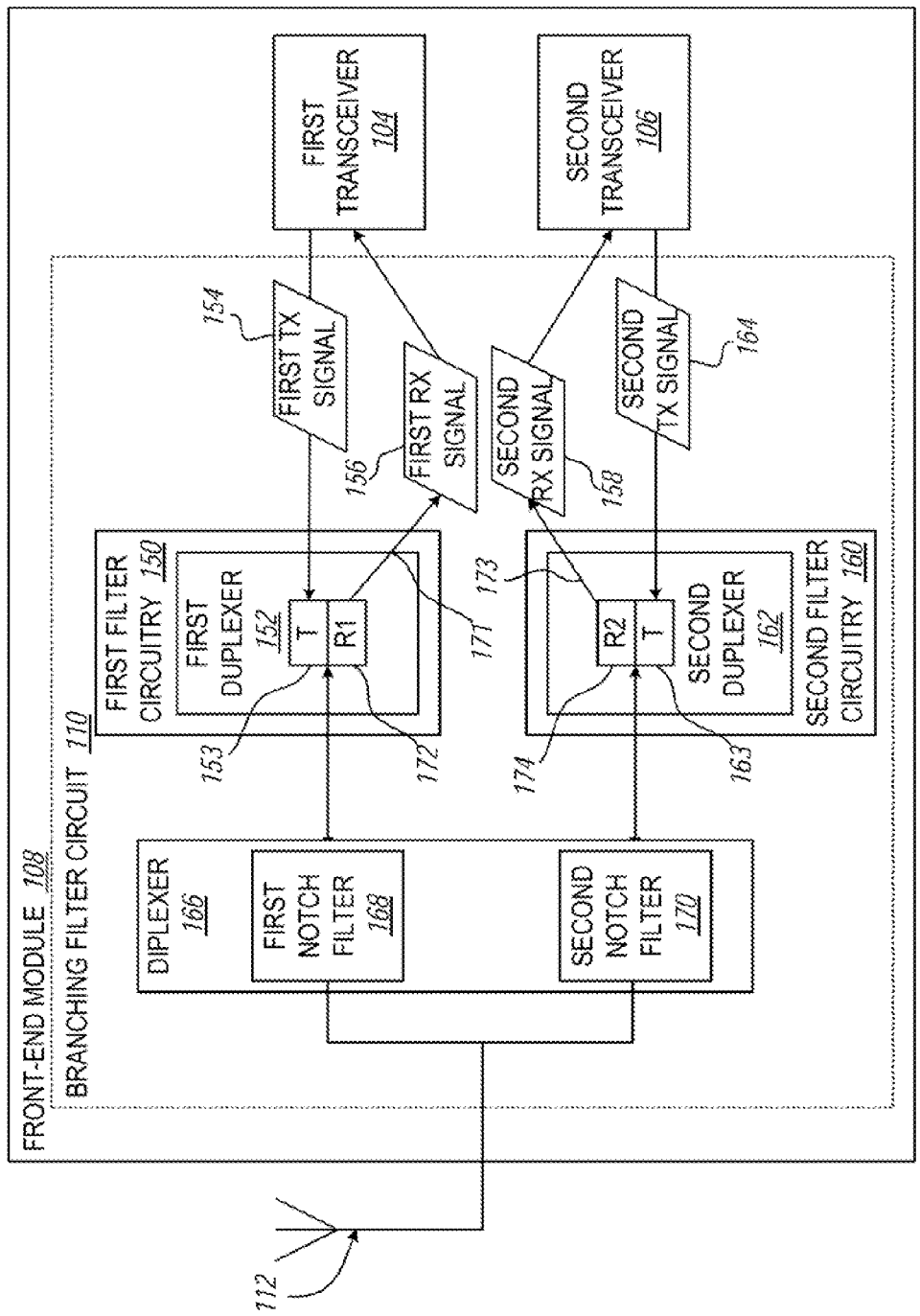
FIG. 2 provides an exemplary schematic block diagram of a front-end module of a communication device having a non band-swapped duplex arrangement, according to one embodiment.

Referring now to FIG. 2, there is depicted one embodiment of a branching filter circuit 110 of a front-end module 108 for the communication device 102 (FIG. 1) in a non-band swapped duplexer arrangement. Branching filter circuitry 110 comprises first filter circuitry 150, second filter circuitry 160, diplexer 166, which includes first notch filter 168 and second notch filter 170, and other components for connecting the first and second transceivers 104, 106 to the at least one antenna 112.

The first filter circuitry 150 is connected between the first transceiver 104 and the first notch filter 168 of the diplexer 166. The first notch filter 168 is connected to the at least one antenna 112. In particular, the first filter circuitry 150 comprises a first duplexer 152 that has a first transmit band-pass filter 153 that transmits a first transmit signal 154 in a first transmit frequency band from the first transceiver 104 to the at least one antenna 112 via the first notch filter 168. The first duplexer 152 has a first receive band-pass filter 172 that transmits a first receive signal 156 in a first receive frequency band to the first transceiver 104 as depicted at 171.

Second filter circuitry 160 comprises a second duplexer 162 that is connected between the second transceiver 106 and the second notch filter 170 of the diplexer 166. The second notch filter 170 is connected to the at least one antenna 112. The second duplexer 162 has a second transmit band-pass filter 163 that transmits a second transmit signal 164 in a second transmit frequency band from the second transceiver 106 to the at least one antenna 112 via the second notch filter 170. The second duplexer 162 has a second receive band-pass filter 174 that transmits second receive signal 158 in the second receive frequency band received from the second notch filter 170 to the second transceiver 106 as depicted at 173.

The diplexer 166 is formed from the first notch filter 168 and the second notch filter 170. The first notch filter 168 transmits signals in the first transmit frequency band from the first duplexer 152 to the at least one antenna 112. The first notch filter 168 transmits signals in the first receive frequency band from the at least one antenna 112 to the first duplexer 152. The first notch filter 168 attenuates the second transmit signal 164 in the second transmit frequency band received from the second filter circuitry 160 and second notch filter 170 to the first duplexer 152. The second notch filter 170 transmits signals in the second transmit frequency band from the second duplexer 162 to the at least one antenna 112. The second notch filter 168 transmits signals in the second receive frequency band from the at least one antenna 112 to the second duplexer 162. The second notch filter 170 attenuates the first transmit signal 154 in the first transmit frequency band received from the first filter circuitry 150 and first notch filter 168 to the second duplexer 152.

Figure 3:
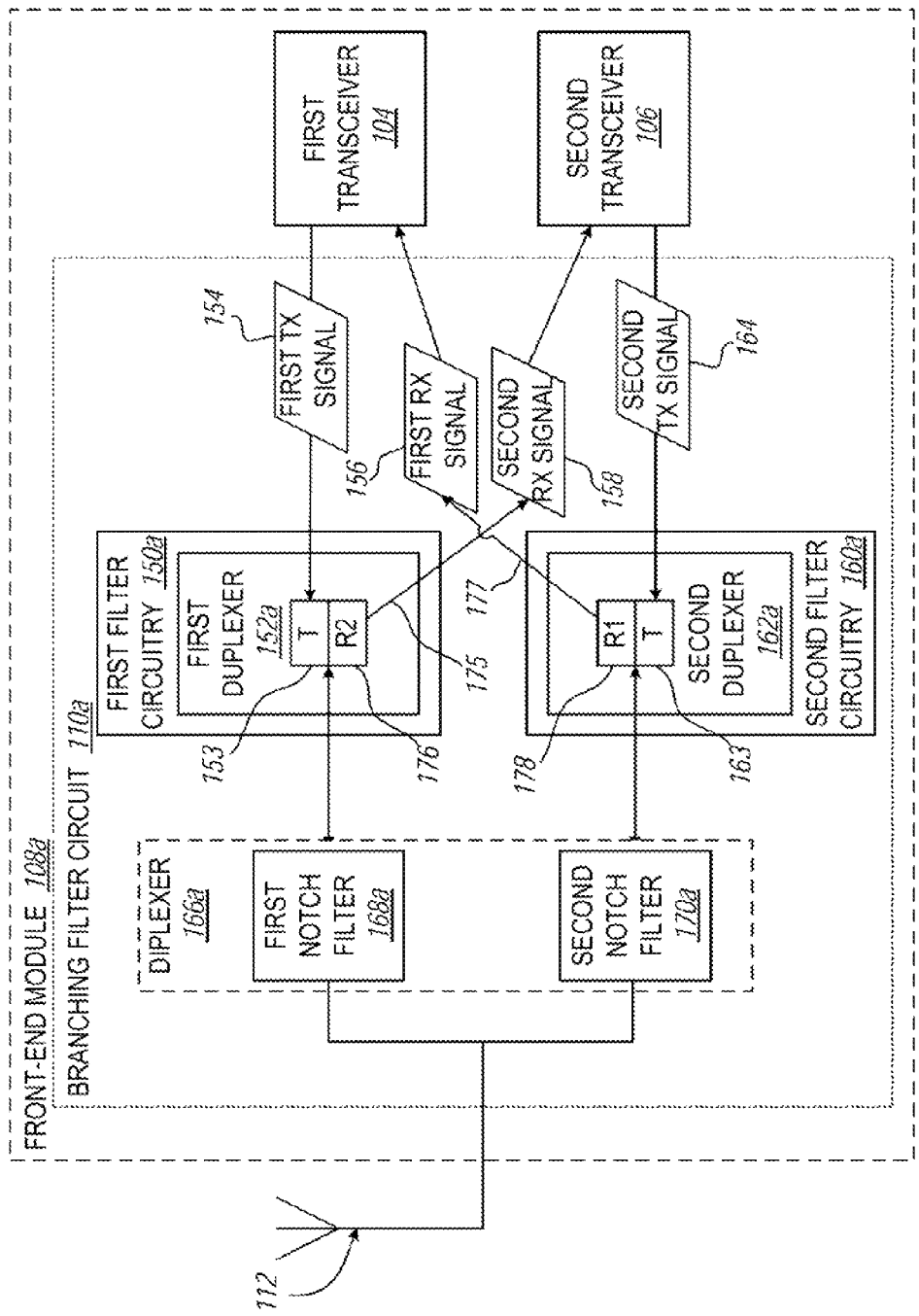
FIG. 3 provides an exemplary schematic block diagram of a front-end module of a communication device having a band-swapped duplex arrangement according to an additional embodiment.

Referring now to FIG. 3, there is depicted another embodiment of a branching filter circuit 110a of a front-end module 108a for the communication device 102 (FIG. 1) in a band swapped duplexer arrangement. Branching filter circuitry 110a comprises first filter circuitry 150a, second filter circuitry 160a, diplexer 166a, which includes first notch filter 168a and second notch filter 170a, and other components for connecting the first and second transceivers 104, 106 to the at least one antenna 112.

The first filter circuitry 150a is connected between the first transceiver 104 and the first notch filter 168a of the diplexer 166a. The first notch filter 168a is connected to the at least one antenna 112. In particular, the first filter circuitry 150a comprises a first duplexer 152a that has the first transmit band-pass filter 153 that transmits the first transmit signal 154 in the first transmit frequency band from the first transceiver 104 to the at least one antenna 112 via the first notch filter 168*a*. The first duplexer 152 has a second receive band-pass filter 176 that transmits the second receive signal 156 in the second receive frequency band to the second transceiver 106 as depicted at 177.

Second filter circuitry 160*a* comprises a second duplexer 162*a* that is connected between the second transceiver 106 and the second notch filter 170*a* of the diplexer 166*a*. The second notch filter 170*a* is connected to the at least one antenna 112. The second duplexer 162*a* has the second transmit band-pass filter 163 that transmits the second transmit signal 164 in the second transmit frequency band from the second transceiver 106 to the at least one antenna 112 via the second notch filter 170*a*. The second duplexer 162*a* has a first receive band-pass filter 178 that transmits the first receive signal 156 in the first receive frequency band received from the second notch filter 170*a* to the first transceiver 104 as depicted at 175.

The diplexer 166*a* is formed from the first notch filter 168*a* and the second notch filter 170*a*. The first notch filter 168*a* transmits signals in the first transmit frequency band from the first duplexer 152*a* to the at least one antenna 112. The first notch filter 168*a* transmits signals in the second receive frequency band from the at least one antenna 112 to the first duplexer 152*a*. The first notch filter 168*a* attenuates the second transmit signal 164 in the second transmit frequency band received from the second filter circuitry 160*a* and second notch filter 170*a* to the first duplexer 152*a*. The second notch filter 170*a* transmits signals in the second transmit frequency band from the second duplexer 162*a* to the at least one antenna 112. The second notch filter 168*a* transmits signals in the first receive frequency band from the at least one antenna 112 to the second duplexer 162*a*. The second notch filter 170*a* attenuates the first transmit signal 154 in the first transmit frequency band received from the first filter circuitry 150*a* and first notch filter 168*a* to the second duplexer 162*a*.

Figure 4:
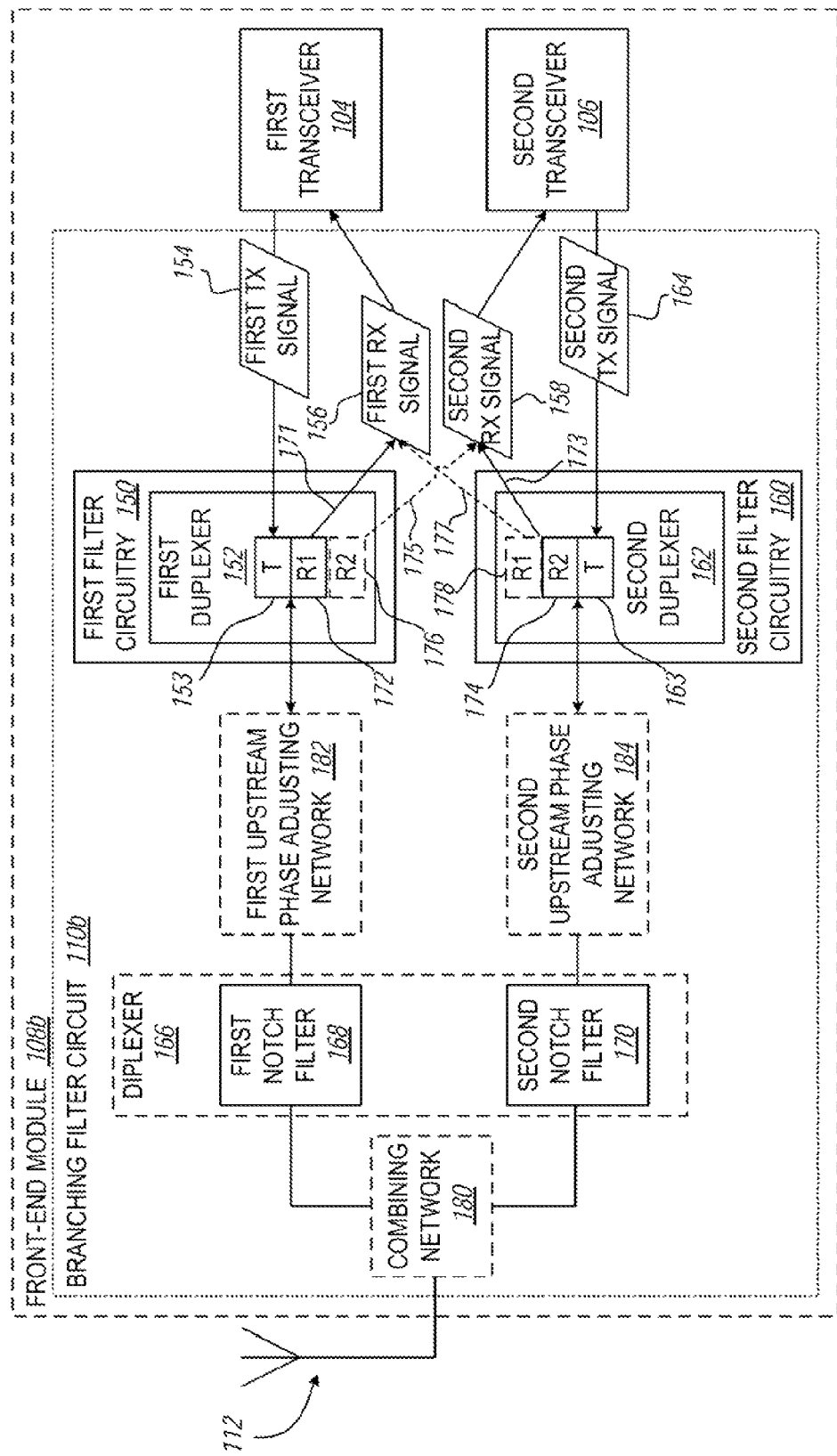
FIG. 4 provides an exemplary schematic block diagram of a front-end module having a combining network and upstream phase adjusting networks for either the nonband-swapped duplex arrangement of FIG. 2 or the band-swapped duplex arrangement of FIG. 3, according to a further embodiment.

FIG. 4 depicts another exemplary embodiment of a branching filter circuit 110*b* of the front-end 108*b* for the communication device 102 (FIG. 1). The branching filter circuit is depicted in the non-band swapped duplexer arrangement, described above with reference to FIG. 2, and includes a combining network 180. The branching filter circuit is also depicted in the band swapped duplexer arrangement, shown in phantom, described above with reference to FIG. 3. The first notch filter 168 and the second notch filter 170 comprise a combined output. A combining network 180 is connected between an output of the first notch filter 168, an output of the second notch filter 170 and the at least one antenna 112. The combining network 180 adjusts impedances in the first receive and first transmit frequency bands to transmit the first receive and first transmit signals between the first transceiver 104 and the at least one antenna 112. The combining network 180 adjusts impedances in the second receive and second transmit frequency bands to transmit the second receive and second transmit signals between the second transceiver and the at least one antenna.

In an embodiment, combining network 180 comprises a first series network between antenna 112 and first notch filter 168, and a second series network between antenna 112 and second notch filter 170. In the non-band swapped duplexer embodiment, the first series network rotates the complex impedance of first notch filter 168 toward an open circuit impedance in the second transmit band and the second receive band, and the second series network rotates the complex impedance of second notch filter 170 toward an open circuit impedance in the first transmit band and the first receive band. In the band swapped duplexer embodiment, the first series network rotates the complex impedance of first notch filter 168 toward an open circuit impedance in the second transmit band and the first receive band, and the second series network rotates the complex impedance of second notch filter 170 toward an open circuit impedance in the first transmit band and the second receive band. In another embodiment the series networks are low pass networks comprising series inductors and shunt capacitors. In yet another embodiment, the series networks are high pass networks comprising series capacitors and shunt inductors. In another embodiment, one of the series networks is a low pass network and the other of the series networks is a high pass network.

Band swapped and non-band swapped filter arrangements are possible. First duplexer 152 comprises a selected one of a first receive band-pass filter and a second receive band-pass filter, and second duplexer 162 comprises the other one of the first receive band-pass filter and second receive band-pass filter. In the non-band swapped embodiment, the selected receive band-pass filter of the first duplexer 152 is the first receive band-pass filter 172 and the other receive band-pass filter of second duplexer 162 is a second receive band-pass filter 174. In a band swapped embodiment, the selected receive band-pass filter of first duplexer 152 is a second receive band-pass filter 176 (shown in phantom) and the other receive band-pass filter of second duplexer 162 is a second receive band-pass filter 178 (shown in phantom).

In an alternate embodiment, in addition to the combining network 180, the branching filter circuit 110*b* can comprise a first upstream phase adjusting network 182 that is connected between the first duplexer 152 and the first notch filter 168. Also, the branching filter circuit 110*b* can comprise a second upstream phase adjusting network 184 that is connected between the second duplexer 162 and the second notch filter 170. The first upstream phase adjusting network 182 aligns impedances in the other one of the first receive frequency band and second receive frequency band, with impedances in the second transmit band as measured from the output of notch filter 168. The second upstream phase adjusting network 184 aligns frequency impedances with the selected one of the first receive frequency band and the second receive frequency band and the first transmit band as measured from the output of notch filter 170.

In a further exemplary embodiment, each of the first notch filter 168 and the second notch filter 170 comprise a minimum set of resonators (not shown) required to reject the second transmit signal 164 and the first transmit signal 154, respectively.

The combining network 180 or the first and second upstream phase adjusting networks 182, 184 can be implemented as well in the branching filter circuit 110*a* of the front-end module 108*a* (FIG. 3). As annotated by dashed lines, the first and second filter circuitry 150, 160 are depicted as having the alternative arrangement to correspond to the previously described band swapped duplexer arrangement for the first and second duplexers 152*a*, 162*a* (FIG. 3). Thus, the second receive band-pass filter 176 of the first duplexer 152 transmits the second receive signal 158 to the second transceiver 106 as depicted at 177. The first receive band-pass filter 178 of the second duplexer 162 transmits the first receive signal 156 to the first transceiver 104 as depicted at 175.

Figure 5:
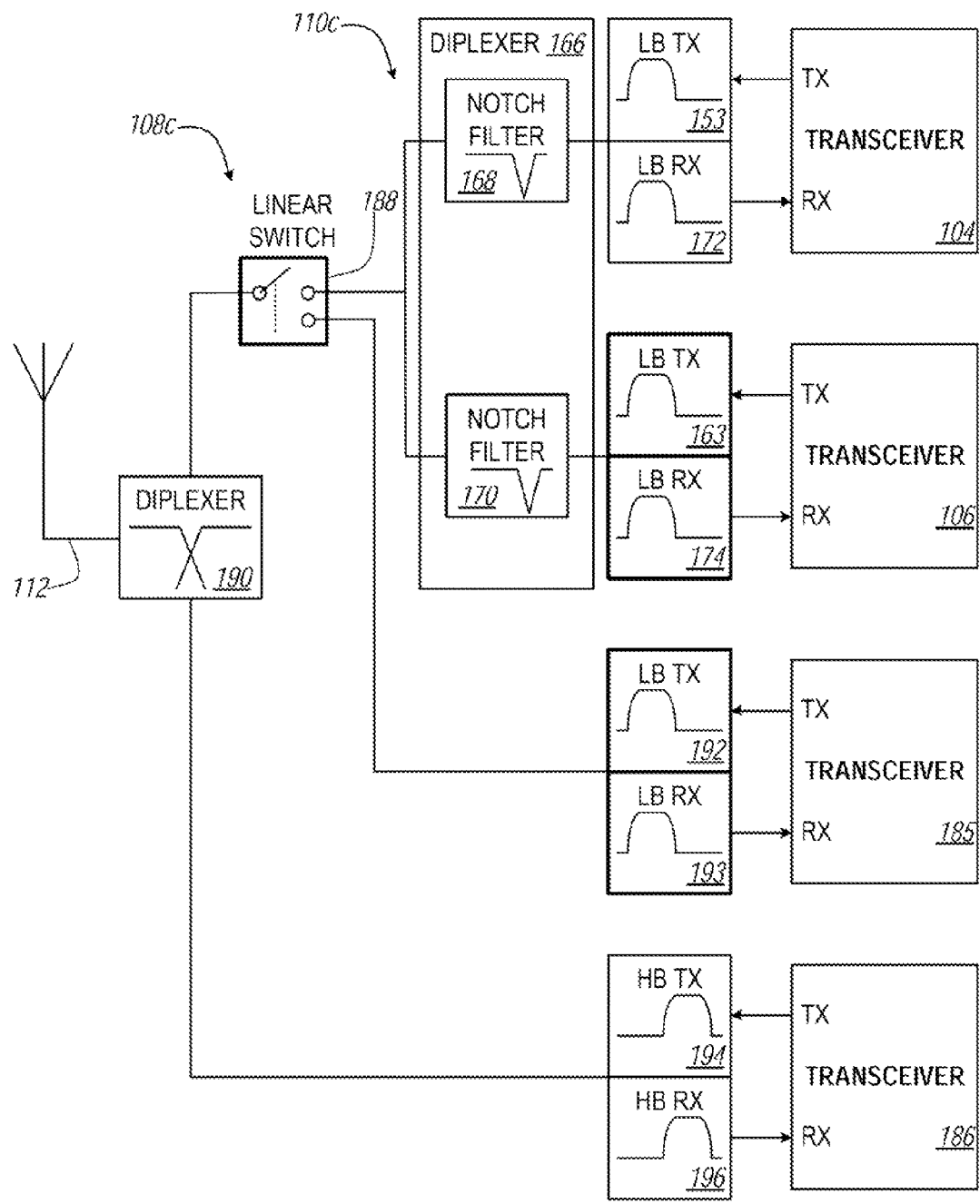
FIG. 5 provides a second exemplary schematic block diagram of a front-end module of a communication device according to one embodiment.

As further illustrated by FIG. 5, in one embodiment of the communication device 102 (FIG. 1), a branching filter circuit 110*c* of a front-end module 108*c* incorporates the first and second transceivers 104, 106 for a cellular low band. The first and second transceiver 104, 106 can transmit simultaneously. The front-end module 108*c* includes at least a third transceiver 185 that operates in a cellular low-band and, according to the illustrative embodiment, a fourth transceiver 186. The branching filter circuit 110c incorporates a high linearity switch, linear switch 188, to selectively connect to a wideband diplexer 190 when the cellular high-band is selected. In one embodiment, the high linearity switch is a PIN diode based switch. Importantly, linear switch 188 must have high linearity when transceivers 104 and 106 are operating simultaneously. The linearity of linear switch 188 refers to its capability to transmit two transmit signals without generating a high level of intermodulation distortion. An approach to measure the intermodulation distortion suppression capability is the "third-order intercept" approach. The third-order intercept point is a theoretical point on the RF input versus Intermediate Frequency (IF) output curve where the desired output signal and third-order products become equal in amplitude as RF input is raised. In one embodiment, linear switch 188 has a third order intercept of +90 dBm, and the intermodulation distortion that is generated is sufficiently low that receiver interference due is avoided when transceivers 104 and 106 are simultaneously transmitting. Transceiver 185 transmits and receives through a duplex filter comprising transmit filter 192 and receive filter 193, which connects to the antenna 112 via linear switch 188 and wideband diplexer 190. The front-end module 108c includes at least a fourth transceiver 185 that operates in a cellular high-band. Transceiver 186 transmits and receives through a duplex filter comprising transmit filter 194 and receive filter 196, which connects to the antenna 112 via wideband diplexer 190.

Figure 6:
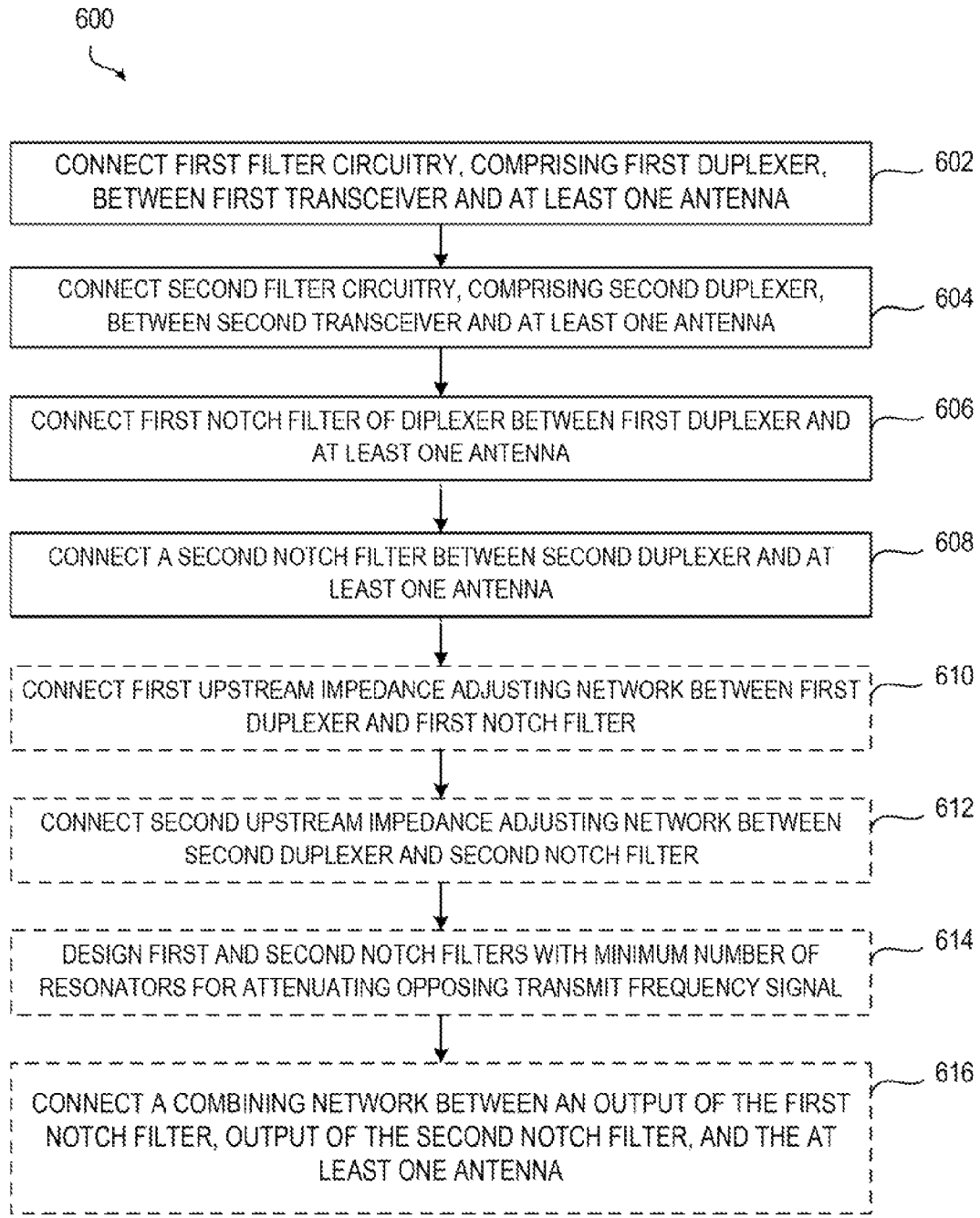
FIG. 6 provides a flow diagram of a method for assembling branching filter circuitry for simultaneous transmission by a communication device according to one embodiment.

Referring to FIG. 6, there is depicted a method 600 for designing branching filter circuitry of a communication device, such as communication device 102 (FIG. 1), for simultaneous transmission by multiple transceivers, according to one embodiment. First filter circuitry, which comprises a first duplexer, is connected between a first transceiver and the at least one antenna (block 602). Second filter circuitry, which comprises a second duplexer, is connected between a second transceiver and the at least one antenna (block 604). A diplexer isolates the first transceiver from the second transmit signal and isolates the second transceiver from the first transmit signal. In particular, a first notch filter of a diplexer, which attenuates the second transmit signal, is connected between the first duplexer and the at least one antenna (block 606). Also, a second notch filter, which attenuates the first transmit signal, is connected between the second duplexer and the at least one antenna (block 608).

In an exemplary embodiment, a first upstream impedance adjusting network can be connected between the first duplexer and the first notch filter (block 610). A second upstream impedance adjusting network can also be connected between the second duplexer and the second notch filter (block 612). The first and second upstream impedance adjusting networks enable use of notch filters with a minimum number of resonators required to isolate one of the first and second transmit frequency bands with having to isolate either of the first and second receive signals (block 614). Alternatively or in addition, a combining network can be connected between an output of the first notch filter, an output of the second notch filter, and the at least one antenna (block 616).

Figure 7:
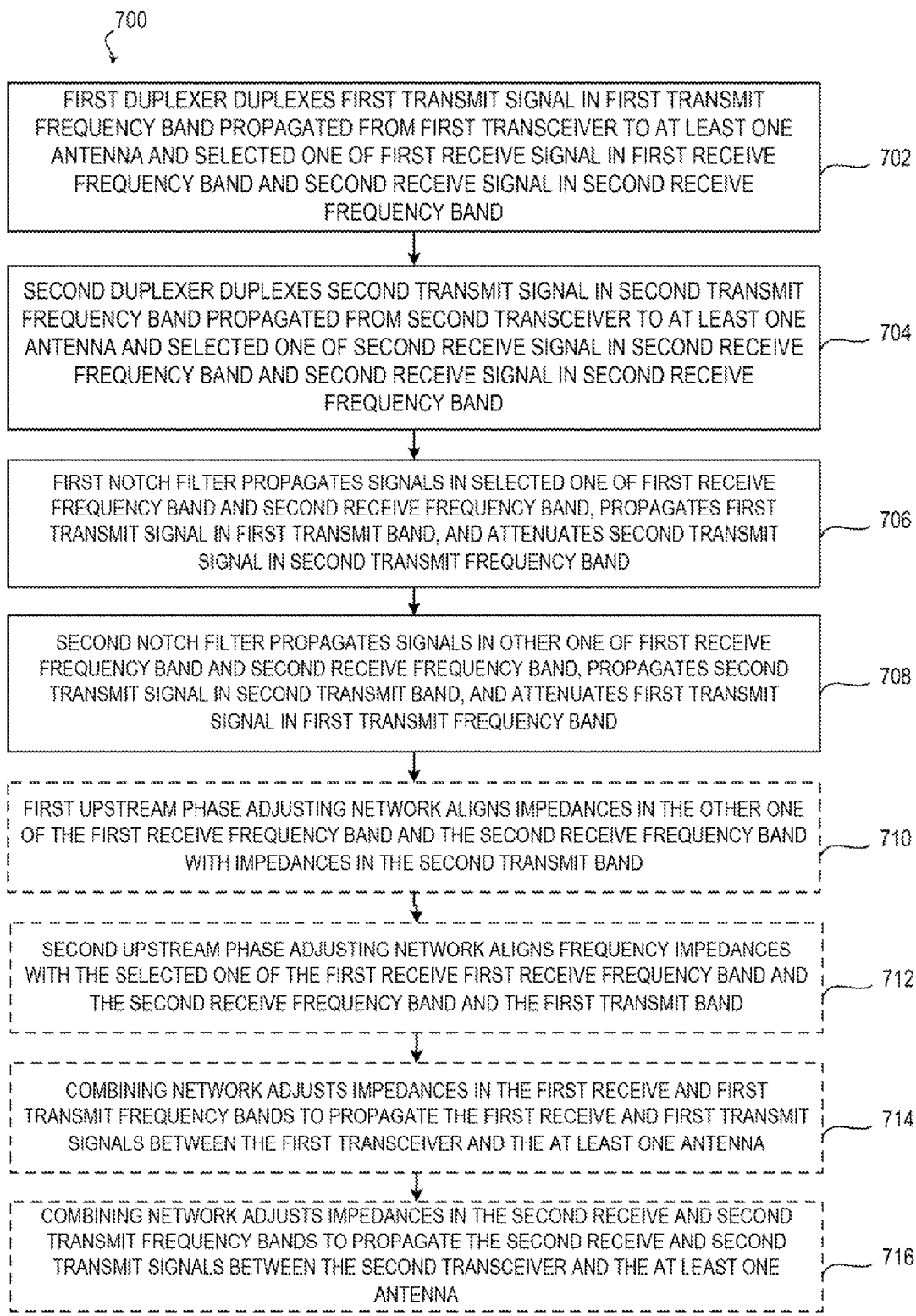
FIG. 7 provides a flow diagram of a method for simultaneous transmission by a communication device configured according to one or more of FIGS. 1-5, in accordance with one embodiment.

Referring to FIG. 7, there is depicted a method 700, that is performed within a communication device, such as device 102 (FIG. 1), for simultaneous transmission by multiple transceivers, according to one embodiment. The components described herein correspond to the similar components illustrated within FIGS. 1-5 and described above. According to the presented blocks of the method, a first duplexer duplexes (1) a first transmit signal in a first transmit frequency band transmitted from a first transceiver to at least one antenna and (2) a selected one of a first receive signal in a first receive frequency band and a second receive signal in a second receive frequency band (block 702). The second duplexer duplexes (1) a second transmit signal in a second transmit frequency band transmitted from a second transceiver to the at least one antenna and (2) a selected one of a second receive signal in a second receive frequency band and a first receive signal in a first receive frequency band (block 704). The first notch filter transmits signals in the selected one of a first receive frequency band and a second receive frequency band, transmits the first transmit signal in the first transmit band, and attenuates the second transmit signal in the second transmit frequency band (block 706). The second notch filter transmits signals in the other one of the first receive frequency band and the second receive frequency band, transmits the second transmit signal in the second transmit band, and attenuates the first transmit signal in the first transmit frequency band (block 708).

In an exemplary embodiment, the first upstream phase adjusting network aligns impedances in the other one of the first receive frequency band and the second receive frequency band with impedances in the second transmit band (block 710). The second upstream phase adjusting network aligns frequency impedances with the selected one of the first receive first receive frequency band and the second receive frequency band and the first transmit band (block 712). With the impedance mismatch created by the first and second upstream phase adjusting networks, the second receive signal is isolated from the first transceiver and the first receive signal is isolated from the second transceiver, respectively. Thereby, the first and second notch filters need not attenuate the receive signals.

Alternatively or in addition, the combining network adjusts impedances in the first receive and first transmit frequency bands to transmit the first receive and first transmit signals between the first transceiver and the at least one antenna (block 714). The combining network adjusts impedances in the second receive and second transmit frequency bands to transmit the second receive and second transmit signals between the second transceiver and the at least one antenna (block 716).

In each of the flow charts above, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A communication device, comprising:
    first filter circuitry connected between a first transceiver and at least one antenna, the first filter circuitry comprising a first duplexer that transmits a first transmit signal in a first transmit frequency band from the first transceiver to the at least one antenna and that transmits a selected one of a first receive signal in a first receive frequency band and a second receive signal in a second receive frequency band;
    second filter circuitry connected between a second transceiver and the at least one antenna, the second filter circuitry comprising a second duplexer that transmits a second transmit signal in a second transmit frequency band from the second transceiver to the at least one antenna and that transmits another one of the first receive signal in the first receive frequency band and the second receive signal in the second receive frequency band;
    a diplexer comprising:
        a first notch filter connected between the first duplexer and the at least one antenna which: transmits signals in the selected one of the first receive frequency band and the second receive frequency band, transmits the first transmit signal in the first transmit band, and attenuates the second transmit signal in the second transmit frequency band, and
        a second notch filter connected between the second duplexer and the at least one antenna which: transmits signals in the other one of the first receive frequency band and the second receive frequency band, transmits the second transmit signal in the second transmit band, and attenuates the first transmit signal in the first transmit frequency band; and
    a combining network, connected between an output of the first notch filter, an output of the second notch filter, and the at least one antenna, wherein the combining network adjusts impedances in the first receive frequency band and the first transmit frequency band to couple the first receive signal and the first transmit signal between the first transceiver and the at least one antenna, and adjusts impedances in the second receive frequency band and the second transmit frequency band to couple the second receive signal and the second transmit signal between the second transceiver and the at least one antenna.

2. The communication device of claim 1, wherein:
    the first duplexer of the first filter circuitry comprises a first band-pass filter which passes the first receive signal in the first receive frequency band;
    the first band-pass filter is connected to the first transceiver;
    the second duplexer of the second filter circuitry comprises a second band-pass filter which passes the second receive signal in the second receive frequency band; and
    the second band-pass filter is connected to the second transceiver.

3. The communication device of claim 1, wherein:
    the first duplexer of the first filter circuitry further comprises a second band-pass filter that passes the second receive signal in the second receive frequency band, and the second band-pass filter is connected to the second transceiver; and
    the second duplexer of the second filter circuitry further comprises a first band-pass filter that passes the first receive signal in the first receive frequency band, and the first band-pass filter is connected to the first transceiver.

4. The communication device of claim 1, wherein the first notch filter and the second notch filter comprise a combined output connected to the at least one antenna.

5. The communication device of claim 1, wherein each of the first notch filter and the second notch filter comprise a minimum set of resonators required to reject the second transmit signal and the first transmit signal, respectively.

6. The communication device of claim 1, further comprising:
    a first PIN diode based switch that selectively connects the first duplexer and the second duplexer to the at least one antenna; and
    a second PIN diode based switch that selectively connects a third transceiver to the at least one antenna, the third transceiver receives a third transmit signal in a third frequency band from the at least one antenna.

7. A communication device, comprising:
    first filter circuitry connected between a first transceiver and at least one antenna, the first filter circuitry comprising a first duplexer that transmits a first transmit signal in a first transmit frequency band from the first transceiver to the at least one antenna and that transmits a selected one of a first receive signal in a first receive frequency band and a second receive signal in a second receive frequency band;

second filter circuitry connected between a second transceiver and the at least one antenna, the second filter circuitry comprising a second duplexer that transmits a second transmit signal in a second transmit frequency band from the second transceiver to the at least one antenna and that transmits another one of the first receive signal in the first receive frequency band and the second receive signal in the second receive frequency band;

a diplexer comprising:
- a first notch filter connected between the first duplexer and the at least one antenna which: transmits signals in the selected one of the first receive frequency band and the second receive frequency band, transmits the first transmit signal in the first transmit band, and attenuates the second transmit signal in the second transmit frequency band, and
- a second notch filter connected between the second duplexer and the at least one antenna which: transmits signals in the other one of the first receive frequency band and the second receive frequency band, transmits the second transmit signal in the second transmit band, and attenuates the first transmit signal in the first transmit frequency band; and
- a first upstream phase adjusting network connected between the first duplexer and the first notch filter which aligns impedances in the other one of the first receive frequency band and the second receive frequency band, with impedances in the second transmit band; and
- a second upstream phase adjusting network connected between the second duplexer and the second notch filter and which aligns frequency impedances with the selected one of the first receive first receive frequency band and the second receive frequency band and the first transmit band.

8. A method performed in a communication device for simultaneous transmission by multiple transceivers, the method comprising:

duplexing a first transmit signal in a first transmit frequency band transmitted from a first transceiver to at least one antenna and a selected one of a first receive signal in a first receive frequency band and a second receive signal in a second receive frequency band, by first filter circuitry connected between a first transceiver and the at least one antenna and comprising a first duplexer;

duplexing a second transmit signal in a second transmit frequency band transmitted from a second transceiver to the at least one antenna and a selected one of a second receive signal in a second receive frequency band and a first receive signal in a first receive frequency band, by second filter circuitry connected between a second transceiver and the at least one antenna and comprising a second duplexer; and diplexing to isolate the first transceiver from the second transmit signal and to isolate the second transceiver from the first transmit signal by using a diplexer comprising:
- a first notch filter connected between the first duplexer and the at least one antenna which: transmits signals in the selected one of a first receive frequency band and a second receive frequency band, transmits the first transmit signal in the first transmit band, and attenuates the second transmit signal in the second transmit frequency band, and
- a second notch filter connected between the second duplexer and the at least one antenna which: transmits signals in the other one of the first receive frequency band and the second receive frequency band, transmits the second transmit signal in the second transmit band, and attenuates the first transmit signal in the first transmit frequency band; and adjusting impedances in the first receive frequency band and the first transmit frequency band to couple the first receive signal and the first transmit signal between the first transceiver and the at least one antenna, and adjusting impedances in the second receive frequency band and the second transmit frequency band to couple the second receive signal and the second transmit signal between the second transceiver and the at least one antenna by a combining network that is connected between an output of the first notch filter, an output of the second notch filter, and the at least one antenna.

9. The method of claim 8, wherein:
the first duplexer of the first filter circuitry comprises a first band-pass filter which passes the first receive signal in the first receive frequency band;
the first band-pass filter is connected to the first transceiver;
the second duplexer of the second filter circuitry comprises a second band-pass filter which passes the second receive signal in the second receive frequency band; and
the second band-pass filter is connected to the second transceiver.

10. The method of claim 9, wherein:
the first duplexer of the first filter circuitry further comprises a second band-pass filter that passes the second receive signal in the second receive frequency band, and the second band-pass filter is connected to the second transceiver; and
the second duplexer of the second filter circuitry further comprises a first band-pass filter that passes the first receive signal in the first receive frequency band, and the first band-pass filter is connected to the first transceiver.

11. The method of claim 8, wherein the first notch filter and the second notch filter comprise a combined output connected to the at least one antenna.

12. The method of claim 8, wherein each of the first notch filter and the second notch filter comprise a minimum set of resonators required to reject the second transmit signal and the first transmit signal, respectively.

13. The method of claim 8, further comprising:
selectively connecting the first duplexer and the second duplexer to the at least one antenna by a first PIN diode based switch; and
selectively connecting a third transceiver to the at least one antenna by a second PIN diode based switch, wherein the third transceiver receives a third transmit signal in a third frequency band from the at least one antenna.

14. A method performed in a communication device for simultaneous transmission by multiple transceivers, the method comprising:

duplexing a first transmit signal in a first transmit frequency band transmitted from a first transceiver to at least one antenna and a selected one of a first receive signal in a first receive frequency band and a second receive signal in a second receive frequency band, by first filter circuitry connected between a first transceiver and the at least one antenna and comprising a first duplexer;

duplexing a second transmit signal in a second transmit frequency band transmitted from a second transceiver to the at least one antenna and a selected one of a second receive signal in a second receive frequency band and a first receive signal in a first receive frequency band, by second filter circuitry connected between a second transceiver and the at least one antenna and comprising a second duplexer; and diplexing to isolate the first transceiver from the second transmit signal and to isolate the second transceiver from the first transmit signal by using a diplexer comprising:
- a first notch filter connected between the first duplexer and the at least one antenna which: transmits signals in the selected one of a first receive frequency band and a second receive frequency band, transmits the first transmit signal in the first transmit band, and attenuates the second transmit signal in the second transmit frequency band, and
- a second notch filter connected between the second duplexer and the at least one antenna which: transmits signals in the other one of the first receive frequency band and the second receive frequency band, transmits the second transmit signal in the second transmit band, and attenuates the first transmit signal in the first transmit frequency band;

aligning impedances in the other one of the first receive frequency band and the second receive frequency band with impedances in the second transmit band, wherein the aligning is performed via a first upstream phase adjusting network connected between the first duplexer and the first notch filter which aligns impedances; and aligning frequency impedances with the selected one of the first receive first receive frequency band and the second receive frequency band and the first transmit band, wherein the aligning is performed via a second upstream phase adjusting network connected between the second duplexer and the second notch filter and which.

* * * * *